Patented Sept. 22, 1936

2,054,865

UNITED STATES PATENT OFFICE 2,054,865

PROCESS FOR MAKING ALIPHATIC ACID ANHYDRIDES

Horace Finningley Oxley and Leonard Fallows, Spondon, near Derby, England, assignors to Celanese Corporation of America, a corporation of Delaware No Drawing. Application July 14, 1930, Serial No. 467,963. In Great Britain September 23, 1929

12 Claims. (Cl. 260—123)

This invention relates to the manufacture of aliphatic anhydrides by the thermal decomposition of vapors of aliphatic acids.

We have now found that silica gel is a highly useful catalyst or contact mass for the reaction.

According to the invention we produce aliphatic anhydrides (and especially acetic anhydride) by subjecting the vapor of aliphatic acids (and especially acetic acid vapor) to thermal decomposition in presence of a catalyst or contact mass consisting of or comprising silica gel.

The thermal decomposition may be performed at temperatures between about 300 and 1000° C., temperatures between about 450 and 700° C. being especially suitable.

The thermal decomposition may be performed in any convenient way, as for instance, by passing the aliphatic acid vapor in presence of the catalyst or contact mass in a stream through apparatus, e. g. tubes, made of fireclay, silica, copper, or chromium nickel steel sold under the trade name "Staybrite" and heated to the desired temperature.

The catalyst or contact mass may for instance be composed entirely of silica gel, and may be employed in any convenient form, such for instance as in the form of pieces, stones, balls or granules of convenient size. If desired, the catalyst or contact mass may comprise other catalysts which promote the scission of aliphatic acids into their anhydrides, such for instance as one or more phosphoric acids; one or more of the water binding agents described in United States Patent No. 1,735,956 issued November 19, 1929; tungstic acid and/or one or more tungstates (other than alkali metal tungstates) especially alkali earth metal tungstates.

When the catalyst or contact mass comprises such other catalyst or catalysts, the same may be employed mixed with the silica gel, or spread upon or otherwise supported upon the silica gel.

Further, if desired, the catalyst or contact mass may comprise filling materials, such for instance as pumice, kieselguhr or the like.

The thermal decomposition may be performed under ordinary atmospheric pressure or under increased pressure (e. g. 1 to 5 atmospheres or more), or under reduced pressure or "vacuum".

The anhydride produced may be separated from the reaction vapors in any suitable way. Preferably however, the anhydride is not recovered by simple condensation of the vapors with subsequent treatment of the condensate, as such method of separation is very liable to cause considerable losses of anhydride through hydrolysis by the water present. To avoid such losses as far as possible, the vapors are preferably themselves subjected to treatment to separate the anhydride from the water vapor present, or formed in the reaction.

In cases where the thermal decomposition of the aliphatic acid vapor is performed under pressures higher than atmospheric, it is preferable, prior to subjecting the reaction vapors to treatment for the recovery or separation of the anhydride, to pass the reaction vapors through one or more reducing valves or the like, in order to reduce the pressure of the vapors substantially to atmospheric pressure.

It is to be understood that the invention is not limited in regard to the strength of aliphatic acid employed. The process can be performed even with the vapors of diluted acids; and besides affording ready means for the manufacture of anhydrides from concentrated or highly concentrated acids, it affords valuable means for preparing anhydrides from waste or dilute acids, and especially waste or dilute acids such as result from the acetylation of cellulose or other industrial acetylation processes.

The following example serves to illustrate a convenient form of execution of the invention, but it is to be understood that the invention is in no way limited thereto.

Example

Acetic acid vapor is passed in a rapid stream through a tube, (e. g. of fireclay), filled with a catalyst in the form of small balls or stones composed of silica gel, or composed of silica gel coated with calcium tungstate, and maintained at a temperature of between about 550 and 650° C. The anhydride so produced is recovered by subjecting the reaction vapors to treatment to separate the anhydride from the water vapor present in said vapors, for instance by causing the vapors leaving the tube to impinge on a flowing stream of cold benzene whereby they are quickly cooled and condensed, the anhydride dissolving in the benzene and being separated from the water simultaneously with condensation. The benzene stream together with the separated water can be collected in a suitable vessel and the water layer separated from the benzene layer. The benzene layer can be fractionally distilled to recover the acetic anhydride.

What we claim and desire to secure by Letters Patent is:—

1. Process for the manufacture of the anhydride of a lower fatty acid by thermal decomposition of the vapor of said acid, which comprises effecting said decomposition in presence of silica gel together with a compound containing an inorganic acid radicle.

2. Process for the manufacture of the anhydride of a lower fatty acid by thermal decomposition of the vapor of said acid, which comprises effecting said decomposition in presence of silica gel together with a compound containing a phosphoric acid radicle.

3. Process for the manufacture of the anhydride of a lower fatty acid by thermal decomposition of the vapor of said acid, which comprises effecting said decomposition of the vapor of said acid, which comprises effecting said decomposition in presence of silica gel together with phosphoric acid.

4. Process for the manufacture of the anhydride of a lower fatty acid by thermal decomposition of the vapor of said acid, which comprises effecting said decomposition in presence of silica gel together with tungstic acid.

5. Process for the manufacture of the anhydride of a lower fatty acid by thermal decomposition of the vapor of said acid, which comprises effecting said decomposition in presence of silica gel together with a salt of an inorganic acid.

6. Process for the manufacture of the anhydride of a lower fatty acid by thermal decomposition of the vapor of said acid, which comprises effecting said decomposition in presence of silica gel together with an alkali earth salt of tungstic acid.

7. Process for the manufacture of acetic anhydride by thermal decomposition of acetic acid vapor, which comprises effecting said decomposition in presence of silica gel together with a compound containing a phosphoric acid radicle.

8. Process for the manufacture of acetic anhydride by thermal decomposition of acetic acid vapor, which comprises effecting said decomposition in presence of silica gel together with phosphoric acid.

9. Process for the manufacture of acetic anhydride by thermal decomposition of acetic acid vapor, which comprises effecting said decomposition in presence of silica gel together with an inorganic acid.

10. Process for the manufacture of acetic anhydride by thermal decomposition of acetic acid vapor, which comprises effecting said decomposition in presence of silica gel together with tungstic acid.

11. Process for the manufacture of acetic anhydride by thermal decomposition of acetic acid vapor, which comprises effecting said decomposition in presence of silica gel together with a salt of an inorganic acid.

12. Process for the manufacture of acetic anhydride by thermal decomposition of acetic acid vapor, which comprises effecting such decomposition at a temperature of about 550 to 650° C. in presence of silica gel together with an alkali earth salt of tungstic acid.

HORACE FINNINGLEY OXLEY.
LEONARD FALLOWS.